(12) United States Patent
Rendahl et al.

(10) Patent No.: US 6,857,262 B2
(45) Date of Patent: Feb. 22, 2005

(54) CATALYTIC CONVERTER FUNCTION DETECTION

(75) Inventors: Craig S. Rendahl, Tuscon, AZ (US); Theresa A. Foley, Delavan, WI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 09/931,603

(22) Filed: Aug. 16, 2001

(65) Prior Publication Data

US 2003/0037538 A1 Feb. 27, 2003

(51) Int. Cl.[7] .................................................. F01N 3/00
(52) U.S. Cl. ............................ 60/277; 60/274; 60/276
(58) Field of Search .......................... 60/277, 274, 276

(56) References Cited

U.S. PATENT DOCUMENTS

| | | | |
|---|---|---|---|
| 3,696,247 A | 10/1972 | McIntosh et al. ...... 250/83.3 H |
| 3,811,776 A | 5/1974 | Blau, Jr. ...................... 356/51 |
| 3,903,694 A | * 9/1975 | Aine ........................... 60/274 |
| 3,957,372 A | 5/1976 | Jowett et al. ................. 356/51 |
| 3,958,122 A | 5/1976 | Jowett et al. ............... 250/346 |
| 3,973,848 A | 8/1976 | Jowett et al. ................. 356/51 |
| 4,012,144 A | 3/1977 | Hedelman ..................... 356/73 |
| 4,013,260 A | 3/1977 | McClatchie et al. ........ 250/343 |
| 4,101,632 A | * 7/1978 | Lamberti et al. ........... 423/210 |
| 4,160,373 A | 7/1979 | Fastaia et al. ................. 73/23 |
| 4,171,909 A | 10/1979 | Kramer et al. ................ 356/73 |
| 4,204,768 A | 5/1980 | N'Guyen ..................... 356/243 |
| 4,310,249 A | 1/1982 | Kramer ....................... 356/414 |
| 4,348,732 A | 9/1982 | Kreft .......................... 364/571 |
| 4,372,155 A | 2/1983 | Butler et al. .................. 73/114 |

(List continued on next page.)

FOREIGN PATENT DOCUMENTS

EP        0 718 493 A1     6/1996 ............. F02P/5/15
EP        0 849 588 A2     6/1998 .......... G01N/27/16

OTHER PUBLICATIONS

Bureau of Automotive Repair; "On Road Emissions Measurement System (OREMS) Specifications"; OREMS Specifications–Version O, Jan. 28, 2002; 2002 California DCA/BAR.

Jimenez–Palacios, José Luis; "Understanding and Quantifying Motor Vehicle Emissions with Vehicle Specific Power and TILDAS Remote Sensing"; Masschusetts Institute of Technology, Feb. 1999.

Radian Corp.; "Developing an Inspection/Maintenance Program for Alternatively–Fueled Vehicles"; 1993.

Islam, Muhammed, Rendahl, Craig S., CORS, Rebecca; "Wisconsin's Remove Vehicle Emissions Sensing Study"; Final Report 1995.

Walsh, P.A., Gertler, A.W.; "Texas 1996 Remote Sensing Feasibility Study"; Final Report 1997.

Popp, Peter J.; "Development of a High–Speed Ultraviolet Spectrophotometer Capable of Real–Time NO and Aromatic Hydrocarbon Detection in Vehicle Exhaust"; pp. 4–3 & 4–12; Coordinating Research Council 1997.

McVey, Iain Frederick; "Development of a Remote Sensor for Mobile Source Nitric Oxide"; University of Denver 1992.

(List continued on next page.)

*Primary Examiner*—Thomas Denion
*Assistant Examiner*—Diem Tran
(74) *Attorney, Agent, or Firm*—Baker & Hostetler LLP

(57) ABSTRACT

A method and system detects the function of a catalytic converter in a vehicle using data received from an open path emissions sensor. The factors considered include whether the vehicle moving on a road is operating in a closed loop operating condition, whether the vehicle is operating in a cold start mode, and the hydrocarbon and other tailpipe emissions concentrations in an exhaust stream of the vehicle as measured by the open path sensor.

17 Claims, 5 Drawing Sheets

U.S. PATENT DOCUMENTS

| | | | |
|---|---|---|---|
| 4,390,785 A | 6/1983 | Faulhaber et al. | 250/330 |
| 4,432,316 A | 2/1984 | Ogita | 123/328 |
| 4,475,484 A * | 10/1984 | Filho et al. | 60/274 |
| 4,490,845 A | 12/1984 | Steinbruegge et al. | 382/1 |
| 4,560,873 A | 12/1985 | McGowan et al. | 250/339 |
| 4,602,160 A | 7/1986 | Mactaggart | 250/341 |
| 4,632,563 A | 12/1986 | Lord, III | 356/437 |
| 4,638,345 A | 1/1987 | Elabd et al. | 357/24 |
| 4,663,522 A | 5/1987 | Welbourn et al. | 250/223 R |
| 4,678,914 A | 7/1987 | Melrose et al. | 250/343 |
| 4,687,934 A | 8/1987 | Passaro et al. | 250/343 |
| 4,710,630 A | 12/1987 | Kuppenheimer, Jr. et al. | 250/353 |
| 4,746,218 A | 5/1988 | Lord, III | 356/437 |
| 4,795,253 A | 1/1989 | Sandridge et al. | 356/51 |
| 4,818,705 A | 4/1989 | Schneider et al. | 436/164 |
| 4,829,183 A | 5/1989 | McClatchie et al. | 250/346 |
| 4,868,622 A | 9/1989 | Shigenaka | 357/30 |
| 4,875,084 A | 10/1989 | Tohyama | 357/30 |
| 4,914,719 A | 4/1990 | Conlon et al. | 250/339 |
| 4,924,095 A | 5/1990 | Swanson, Jr. | 250/338.5 |
| 4,963,023 A | 10/1990 | Goldovsky et al. | 356/308 |
| 4,999,498 A | 3/1991 | Hunt et al. | 250/338.5 |
| 5,002,391 A | 3/1991 | Wolfrum et al. | 356/307 |
| 5,041,723 A | 8/1991 | Ishida et al. | 250/339 |
| 5,061,854 A | 10/1991 | Kroutil et al. | 250/339 |
| 5,076,699 A | 12/1991 | Ryan et al. | 356/437 |
| 5,157,288 A | 10/1992 | Hill | 307/511 |
| 5,185,648 A | 2/1993 | Baker et al. | 257/198 |
| 5,210,702 A | 5/1993 | Bishop et al. | 364/496 |
| 5,239,860 A | 8/1993 | Harris et al. | 73/61.48 |
| 5,252,828 A | 10/1993 | Kert et al. | 250/339 |
| 5,255,511 A | 10/1993 | Maus et al. | 60/274 |
| 5,307,626 A | 5/1994 | Maus et al. | 60/274 |
| 5,319,199 A | 6/1994 | Stedman et al. | 250/338.5 |
| 5,332,901 A | 7/1994 | Eckles et al. | 250/345 |
| 5,343,043 A | 8/1994 | Johnson | 250/338.5 |
| 5,361,171 A | 11/1994 | Bleier | 359/855 |
| 5,371,367 A | 12/1994 | DiDomenico et al. | 250/338.5 |
| 5,373,160 A | 12/1994 | Taylor | 250/338.5 |
| 5,401,967 A | 3/1995 | Stedman et al. | 250/338.5 |
| 5,418,366 A | 5/1995 | Rubin et al. | 250/338.5 |
| 5,475,223 A * | 12/1995 | Carter, III | 250/339.13 |
| 5,489,777 A * | 2/1996 | Stedman et al. | 250/338.5 |
| 5,498,872 A | 3/1996 | Stedman et al. | 250/338.5 |
| 5,545,897 A | 8/1996 | Jack | 250/339.13 |
| 5,583,765 A | 12/1996 | Kleehammer | 364/423.098 |
| 5,591,975 A * | 1/1997 | Jack et al. | 250/338.5 |
| 5,621,166 A * | 4/1997 | Butler | 73/116 |
| 5,644,133 A | 7/1997 | Didomenico et al. | 250/338.5 |
| 5,719,396 A | 2/1998 | Jack et al. | 250/338.5 |
| 5,726,450 A | 3/1998 | Peterson et al. | 250/338.5 |
| 5,787,705 A * | 8/1998 | Thoreson | 60/274 |
| 5,797,682 A | 8/1998 | Kert et al. | 374/123 |
| 5,812,249 A | 9/1998 | Johnson et al. | 356/28 |
| 5,822,979 A | 10/1998 | Hamburg et al. | 60/274 |
| 5,831,267 A | 11/1998 | Jack et al. | 250/338.5 |
| 5,839,274 A * | 11/1998 | Remsboski et al. | 60/276 |
| 5,922,948 A | 7/1999 | Lesko et al. | 73/117.3 |
| 5,927,068 A * | 7/1999 | Schenk | 60/276 |
| 5,970,706 A * | 10/1999 | Williamson et al. | 60/276 |
| 6,057,923 A | 5/2000 | Sachse | 356/364 |
| 6,230,087 B1 | 5/2001 | Didomenico et al. | 701/29 |
| 6,295,809 B1 * | 10/2001 | Hammerle et al. | 60/286 |
| 6,307,201 B1 | 10/2001 | Didomenico et al. | 250/339.13 |
| 6,460,329 B2 * | 10/2002 | Shimotani et al. | 60/277 |

OTHER PUBLICATIONS

Beaton, S.P., Bishop, G.A. and Stedman D.H.; Emissions Characteristics of Mexico City Vehicles; pp. 42, 1424–1429; Journal of Air and Waste Management Assoc. 1992.

Zhang, Yi, Stedman, Donald H., Bishop, Gary A., Beaton, Stuart P., Guenther, Paul L. and McVey, Ian F.; "Enhancement of Remote Sensing for Mobile Source Nitric Oxide"; Journal of Air & Waste Management 1996; vol. 46, pp. 25–29.

Popp, Peter John; "Remote Sensing of Nitric Oxide Emissions from Planes, Trains and Automobiles"; University of Denver 1999.

Zhang, Yi, Stedman, Donald H., Bishop, Gary A., Beaton, Stuart P., and Guenther, Paul L.; "Worldwide On–Road Vehicle Exhaust Emissions Study by Remote Sensing"; Environmental Science & Technology 1995; vol. 29#9. pp. 2286–2294.

Glover, Edward L., Mickelsen, Jan and McClement Dennis; Evaluation of Methods to Determine Catalyst Efficiency in the Inspection/Maintenance Process; Society of Automotive Engineers; SAE#9600092.

Butler, James, Gierczak, Christine and Liscombe Paula; "Factors Affecting the NDIR Measurement of Exhaust Hydrocarbons"; Coordinating Research Council 1995; pp. 4–171 & 4–190.

MacKay, Gervase I., Nadler, S. Don, Karecki, David R., Schiff, Harold I., Butler, James W., Gierczak, Christine A. and Jesion, Gerald; "Final Phase 1b Report to the CRC and NREL for Research Performed Under Agreement No. VE–8–2"; Coordinating Research Council 1994.

Peterson, James E. and Stedman, Donald H.; "Find and Fix the Polluters"; Chemtech 1992; pp. 47–53.

Bishop, Gary A. and Stedman Donald H.; "Infrared Emissions and Remote Sensing"; Journal of Air and Waste Management Assoc. 1992; vol. 42#5, pp. 695–697.

Bishop, Gary A., Starkey, John R., Ihlenfeldt, Anne, Williams, Walter J. and Stedman Donald H.; "IR Long–Path Photometry: A Remote Sensing Tool for Automobile Emissions"; Analytical Chemistry 1989; vol. 61#10, pp. 671A–677A.

Axelsson, Hakan, Eilard, Anders, Emanuelsson, Annika, Galle, Bo, Edner, Hans, Regnarson Par and Kloo Henrik; "Measurement of Aromatic Hydrocarbons with the DOAS Technique"; Applied Spectroscopy 1995; vol. 49#9, pp. 1254–1260.

Baum, Marc M., Kiyomiya, Eileen S., Kumar Sasi and Lappas, Anastasios M. "Multicomponent Remote Sensing of Vehicle Exhaust by Dispersive Absorption Spectroscopy. 1. Effect of Fuel Type and Catalyst Performance"; Environmental Science and Technology 2000; pp. 34 & 2851–2858.

Stedman, Donald H. and Smith, Dennis L.; "$NO_x$ Data by Remote Sensing"; Coordinating Research Council 1995; pp. 4–47 & 4–63.

Shore, P.R. and Devries, R.S.; "On–line Hydrocarbon Speciation Using FTIR and CI–MS"; Society of Automotive Engineers 1992; SAE #922246.

Bishop, Gary A. and Stedman, Donald H.; "On–Road Carbon Monoxide Emission Measurement Comparisons for the 1988–1989 Colorado Oxy–Fuels Program"; Environmental Science & Technology 1990; pp. 24 & 843–847.

Stedman, Donald H., Bishop, Gary, Peterson, James E., and Geunther, Paul L.; "On–Road CO Remote Sensing in the Los Angeles Basin"; CA–EPA (CARB) 1991; pp. 24 & 843–847.

X–Rite Incorporated; "A Guide to Integrating Sphere Theory and Applications"; 2002; www.labsphere.com.

Guenther, Paul L., Stedman, Donald H., Bishop, Gary A., Beaton, Stuaret P., Bean, James H. and Quine Richard W.; "A Hydrocarbon Detector for the Remote Sensing of Vehicle Exhaust Emissions"; Review of Scientific Instruments 1994; vol. 66(4), pp. 3024–3029.

Stephens, Robert D., Mulawa, Patricia A., Giles, Michael T., Kennedy, Kenneth G., Groblicki, Peter J. and Cadle, Steven H.; "An Experimental Evaluation of Remote Sensing–Based Hydrocarbon Measurements: A Comparison to FID Measurements"; Journal of Air and Waste Management Assoc. 1996; pp. 46 & 148–158.

Stedman, Donald H.; "Automobile Carbon Monoxide Emissions"; Environmental Science and Technology 1989; vol. 23#2, pp. 147–149.

Adachi, Masayuki, Yamagishi, Yutaka, Inoue Kaori and Ishida, Kozo; "Automotive Emissions Analyses using FTIR Spectrophotometer"; Society of Automotive Engineers 1992; SAE #920723.

Koplow, Michael D., Jimenez, Jose L., Nelson, David D., Schmidt, Stephan E.; "Characterization of On–Road Vehicle NO Emissions by Means of a TILDAS Remote Sensing Instrument"; Coordinating Research Council 1997; pp. 8–35 & 8–62.

Guenther, Paul Leonard; "Contributions to On–Road Remoter Sensing of Automobile Exhaust"; University of Denver 1992.

Cox, Frank W., Walls, John R. and Carrel, Mark W.; "Determination of Catalyst Oxidation and Reduction Efficiencies from Tailpipe Emissions Measurements"; Society of Automotive Engineers 1997; SAE #972911.

Lawson, Douglas R., Groblicki, Peter J., Stedman, Donald H., Bishop, Gary A. and Guenther Paul L.; "Emissions from In–Use Motor Vehicles in Los Angeles: A Pilot Study of Remote Sensing and the Inspection and Maintenance Program"; Journal of Air and Waste Management Assoc. 1990; vol. 40#8, pp. 1096–1105.

Stedman, Donald H., Bishop, Gary A. and Pitchford, Marc L.; "Evaluation of a Remote Sensor for Mobile Source CO Emissions"; University of Denver 1991; RPT# EPA 600/4–90/032.

McLaren, Scott E., Stedman, Donald H., Greenlaw, Pamela D., Bath, Raymond J., and Spear, Richard D.; Comparison of an Open Path UV and FTIR Spectrometer; Air and Waste Management Assoc. 1992; vol. 92–73.10.

Bishop, Gary A., Zhang, Yi, McLaren, Scott E., Guenther, Paul L., Beaton, James E., Stedman, Donald H., Duncan, John W., Mcarver Alexander Q., Pierson, William R., Groblicki, Peter J., Knapp, Kenneth T., Zweidinger, Roy B. and Day, Frank J.; Enhancements of Remote Sensing for Vehicle Emissions in Tunnels; Journal of Air and Waste Management 1994; vol. 44, pp. 169–175.

McLaren, Scott E. and Stedman Donald H.; "Flux Measurements Using Simultaneous Long Path Ultraviolet and Infrared Spectroscopy"; Air and Waste Management Assoc. 1990; vol. 90–86.6.

Bishop, Gary A., McLaren, Scott E., Stedman, Donald H., Pierson, William R. Zweidinger, Roy B. and Ray, William D; "Method Comparisons of Vehicle Emissions Measurements in the Fort McHenry and Tuscarora Mountain Tunnels"; Atmospheric Environment 1996; vol. 30#12, pp. 2307–2316.

McLaren, Scott; "Open Path Spectrometers for Atmospheric Monitoring"; University of Denver 1995.

Stedman, Donald H. and Bishop, Gary A.; "An Analysis of On–Road Remote Sensing as a Tool for Automobile Emissions Control"; Illinois Dept. of Energy & Natural Resources 1990; ILENR/RE–AQ–90/05.

Stedman, Donald H., Peterson, James E. and McVey, Iain F.; "On–Road Carbon Monoxide and Hydrocarbon Remote Sensing in the Chicago Area"; Illinois Dept. of Energy & Natural Resources 1991; ILENR/RE–AQ–91/14.

Lyons, Carol E. and Stedman, Donald H.; "Remote Sensing Enhanced Motor Vehicle Emissions Control for Pollution Reduction in the Chicago Metropolitan Area: Siting and Issue Analysis"; Illinois Dept. of Energy & Natural Resources 1991; ILENR/RE–AQ–91/15.

Durbin, Thomas D., Truex, Timothy J. and Norbeck, Joseph M.; "Particulate Measurements and Emissions Characterizations of Alternative Fuel Vechicle Exhaust"; National Renewable Energy Laboratory 1998; NREL/SR–540–25741; Subcont# ACI–7–16637–01.

Didomenico, John, Johnson, Jim, Webster, Jason and Rendahl, Craig S.; "Preliminary Results from Cold Start Sensor Testing"; Coordinating Research Council 1997; pp. 4–71 & 4–72.

Stephens, Robert D. and Cadle, Steven H.; "Remote Sensing Measurements of Carbon Monoxide Emissions from On–Road Vehicles"; Journal of Air and Waste Management Assoc. 1991; vol. 41#1, pp. 39–46.

Jimenez, Jose L., McRae, Gregory J., Nelson, David D., Zahniser, Mark S. and Kolb, Charles E.; "Remote Sensing of NO and $NO_2$ Emissions from Heavy–Duty Diesel Trucks Using Tunable Diode Lasers"; Environmental Science & Technology 2000; pp. 34 & 2380–2387.

Stedman, Donald H., Bishop, Gary A., Guenther, Paul L., Peterson, James E., Beaton, Stuart P. and McVey, Iain F.; "Remote Sensing of On–Road Vehicle Emissions"; University of Denver 1992; Contract #VE–8–1.

Singer, Brett C., Harley, Robert A., Littlejohn, David, Ho, Jerry and Vo, Thu; "Scaling of Infrared Remote Sensor Hydrocarbon Measurements for Motor Vehicle Emission Inventory Calculations"; Environmental Science and Technology 1998; vol. 32#21, pp. 3241–3428.

Atkinson, Chris M., McKain, David L., Gautam, Mridul, El–Gazzar, Laila, Lyons, Donald W. and Clark, Nigel N.; "Speciation of Heavy Duty Diesel Engine Exhaust Emissions"; Coordinating Research Council 1995; pp. 5–71 & 5–92.

Chaney, Lucian W.; "The Remote Measurement of Traffic Generated Carbon Monoxide"; Journal of Air Pollution Control Assoc. 1983; vol. 33#3, pp. 220–222.

Todd, Michael and Barth, Michael; "The Variation of Remote Sensing Emission Measurements with Respect to Vehicle Speed and Acceleration"; Coordinating Research Council 1995; pp. 4–1 & 4–14.

Hoshizaki, H., Wood, A.D and Kemp. D.D.; "Vehicle Inspection Instrumentation"; Lockheed Missiles & Space Company 1973; ARB–3C–235–7.

Sigsby, Jr., John E., TEJADA, Silvestre and Ray, William; "Volatile Organic Compound Emissions from 46 In–Use Passenger Cars"; Environmental Science & Technology 1987; pp. 21 & 466–475.

* cited by examiner

CATALYTIC CONVERTER FUNCTION DETECTION

The present invention relates generally to vehicle emissions sensing systems. More particularly, the present invention relates to a method and system for determining, based on emissions data, whether a vehicle's catalytic converter is functioning in a proper manner.

BACKGROUND OF THE INVENTION

Current methods of determining whether a vehicle is compliant with emission standards include open path and closed path emissions measurement systems. In a closed path system, an emission sensor is directly connected to the exhaust of the vehicle, such as by insertion into a tailpipe. An open path vehicular emissions measurement system collects data by a means other than a direct connection to the tailpipe, such as a remote sensor that analyzes the individual components of emissions. Open path vehicular emission systems are often preferable to closed path systems because they can be used in numerous locations and do not require the vehicle to stop for testing.

However, a shortcoming of the current vehicular emission detection systems, and in particular open path vehicular emissions detection systems, is that they cannot distinguish vehicles having properly functioning catalytic converters from vehicles having failing or missing converters. For example, an emission detection system will preferably measure the levels of emissions of one or more hydrocarbons from a vehicle. If the emissions include one or more hydrocarbons in concentrations that are above threshold levels, the current systems presume that the vehicle's catalytic converter is missing or not properly functioning. Accordingly, the current systems will determine that the vehicle fails the emissions test.

However, high emissions can be caused by operating conditions other than an improperly functioning catalytic converter. For example, when a vehicle is experiencing a high degree of acceleration, it may operate in a temporary "open loop" mode, which means that the engine supplies extra fuel for added power. Open loop operation of a vehicle's engine occurs when the feedback information of the emissions controls of the engine are ignored by the engine process controller such as to generate more power for hard acceleration or provide a richer air/fuel mixture for smoother operation when the engine is cold. An emissions test while this condition occurs will generally show higher carbon monoxide emission levels, which are construed to mean that the vehicle has excess emissions, leading to the false conclusion that the vehicle is violating emission standards. It may be that the vehicle will comply with emission standards once the vehicle returns to closed loop operation when the engine's air/fuel ratio is held by on-board emissions controls to the ideal or stoichiometric ratio. Vehicle engine modes such as those which may result from low speeds, high speeds, and/or initial engine startup or "cold start", may also yield excess emissions in a vehicle having a properly operating catalytic converter.

To try to overcome these shortcomings, prior systems have electronically measured the amount of heat emanating from the vehicle's engine while also measuring the amount of heat reflected from the road surface under the vehicle. This can be an expensive method, as remote heat measuring capabilities must be employed in a system that is rugged enough to handle continuous on-road exposure with sufficient resolution of measurement to distinguish temperatures. Additionally, since vehicles have many different profiles of vehicles, such as from subcompact vehicles that are close to the road surface and large sport-utility vehicles that are relatively high off of the road surface, it is difficult to manufacture an open path temperature measuring device that would have a broad enough field of view to handle all types of vehicle profiles. Also, background influences, such as the amount of sunlight, different types of road surfaces, and the presence of skid plates under vehicles, can contribute to inconsistent results from the prior heat energy measurement methods.

These shortcomings of the current vehicular emissions sensors contribute to increased errors of commission when they are used to identify vehicle with excess emissions. An error of commission occurs when an open path emissions sensor identifies a vehicle as having excess emissions, only to discover in a confirmatory closed-path tailpipe emissions test that the vehicle is functioning within emissions laws.

SUMMARY OF THE INVENTION

The above and other features and advantages are achieved through the use of a novel catalytic converter function detection method and system as herein disclosed. In accordance with one embodiment of the present invention, A method of detecting the function of a catalytic converter in a vehicle includes the steps of: (1) determining a first indication corresponding to whether a vehicle moving on a road is operating in a closed loop operating condition; (2) determining a second indication corresponding to whether the vehicle is operating at a temperature that is substantially at least equal to its normal operating temperature; (3) receiving data collected by an emissions sensor, wherein the data corresponds to a plurality of measured hydrocarbon and other tailpipe emissions concentrations in an exhaust stream of the vehicle; and (4) determining a third indication corresponding to whether the data is indicative of a properly functioning catalytic converter.

Optionally and preferably, the step of determining a first indication includes measuring a speed of the vehicle, measuring an acceleration of the vehicle, measuring a slope of the road, measuring a mass of the vehicle, measuring at least one ambient condition, calculating a specific power using the speed, the acceleration, the slope, the mass, and the at least one ambient condition and comparing the specific power to a predetermined limit. The step of determining a first indication may also include adjusting the acceleration to correspond to the slope.

Optionally, the step of determining a second indication includes using the emissions sensor to measure an amount of water vapor in the exhaust stream, using the emissions sensor to measure an amount of carbon dioxide in the exhaust stream, using the amount of water and the amount of carbon dioxide to determine a ratio of water and carbon dioxide, and comparing the ratio to a predetermined fuel factor. The step of determining a second indication may also use the emissions sensor to measure an amount of 1,3-butadiene in the exhaust stream, and determining whether the amount exceeds a predetermined threshold.

Optionally, the step of determining a third indication includes using the emissions sensor to measure an amount of ethylene in the exhaust stream, using the emissions sensor to measure an amount of acetylene in the exhaust stream, calculating a ratio of the amount of ethylene and the amount of acetylene, and comparing the ratio to a predetermined threshold. The step of determining a third indication may also include using the emissions sensor to measure an amount of total hydrocarbons in the exhaust stream, using the emissions sensor to measure an amount of methane in the exhaust stream, calculating a ratio of the amount of total hydrocarbons and the total methane, and comparing the ratio to a predetermined threshold. The step of determining a third indication may also include using the emissions sensor to measure an amount of ammonia in the exhaust stream, and comparing the amount of ammonia to a predetermined threshold. The step of determining a third indication may also include using the emissions sensor to measure an amount of benzene in the exhaust stream, using the emissions sensor to measure an amount of toluene in the exhaust stream, calculating a ratio of the amount of benzene and the amount of toluene, and comparing the ratio to a predetermined threshold. Optionally and preferably, the steps of calculating and comparing are not required if the first indication is indicative of an open loop operating condition.

In accordance with an alternate embodiment of the present invention, a system for determining whether a moving vehicle has a properly functioning catalytic converter includes an emissions sensor capable of measuring a plurality of measured hydrocarbons in an exhaust stream of a moving vehicle, a processor in communication with the emissions sensor, and a memory in communication with the processor. The memory contains computer program instructions that instruct the processor to perform any or all of the steps described above.

There have thus been outlined the more important features of the invention in order that the detailed description thereof that follows may be better understood, and in order that the present contribution to the art may be better appreciated. There are, of course, additional features of the invention that will be described below and which will form at least part of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting in any way.

As such, those skilled in the art will appreciate that the concept and objectives, upon which this disclosure is based, may be readily utilized as a basis for the design of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention provides a method of determining, based on data received via an emissions measurement system, whether the catalytic converter of a vehicle is present and functioning in a proper manner. The method includes analyzing the vehicle's emissions using an emissions sensor and determining a tailpipe signature, checking the engine's load, and determining whether the vehicle is still in a cold start or open loop mode. If the method or system determines that the engine's load is normal, and the vehicle is not in open loop mode, then the system may presume that abnormal tailpipe signatures are indicative of improper catalytic converter function or the absence of a catalytic converter.

Figure 1:
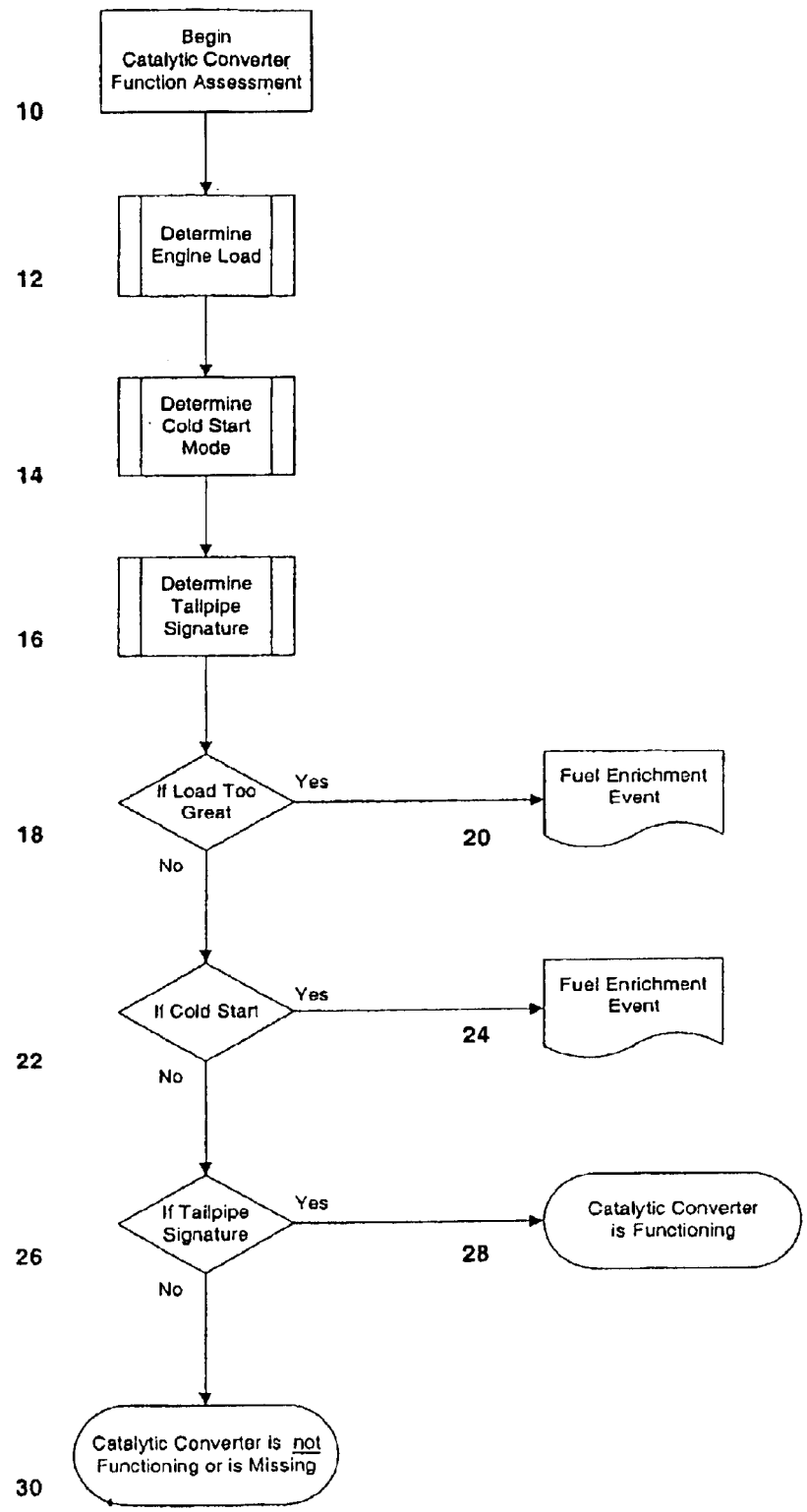
FIG. 1 is a block diagram that illustrates the basic exemplary elements of the present inventive method of detecting catalytic converter function.

An overview of the exemplary primary elements of the present invention is presented in a block diagram in FIG. 1. Referring to FIG. 1, the method of assessing catalytic converter function begins (step 10) by determining the load to which an engine of a vehicle is being subjected (step 12). The method also includes determining whether the vehicle is in a "cold start" mode as opposed to operating at normal operating temperature (step 14). The system also determines a tailpipe signature for the vehicle (step 16) by analyzing the vehicle's emissions using an emissions sensor. Preferably, the sensor is an open path emissions sensor, although closed path emissions sensors may be used in alternate embodiments.

If the system determines that the vehicle's load is equal to or exceeds a predetermined threshold (step 18), the system presumes that any excess carbon monoxide, hydrocarbon, and/or nitrogen monoxide emissions that may be detected by the emissions sensor are resulting from a fuel enrichment event (step 20) rather than an improperly functioning catalytic converter. For example, operation of a vehicle at high acceleration can yield higher nitrogen oxide emissions at the tailpipe because higher temperature combustion is occurring during the acceleration condition. Carbon monoxide emissions may also temporarily increase during an acceleration condition. These excess emissions can also saturate a properly functioning catalytic converter that will take an interval of time to overcome. Conversely, periods of rapid deceleration can yield higher total hydrocarbon (THC) emissions. Thus, open path emissions tests are preferably performed while the vehicle is traveling anywhere from a constant speed up to a moderate acceleration.

In addition, if the vehicle has not achieved a substantially normal operating temperature (step 22) the system also presumes that the vehicle is experiencing a fuel enrichment event (step 24) as the vehicle warms up from its cold start mode. Older engines without a fuel injection system had a choke to enrich the air/fuel mixture and improve cold engine operation. Modern fuel injected engines also enrich the air/fuel mixture to reduce/eliminate cold engine stumbling and other harshness. Hence, a cold start is a fuel enrichment event albeit for a different reason than for heavy acceleration. Again, a fuel enrichment event is not presumed to be a malfunctioning or missing catalytic converter.

If the system determines that the vehicle is neither under an abnormal load nor in cold start mode, and if the vehicle's tailpipe signature still yields excess emissions (step 26) the system presumes that the catalytic converter is either not properly functioning or missing (step 30). If the tailpipe signature yields normal emissions or emissions exhibiting hydrocarbons that are below predetermined thresholds (step 26) the system presumes that the catalytic converter is functioning in a proper manner (step 28).

Figure 2:
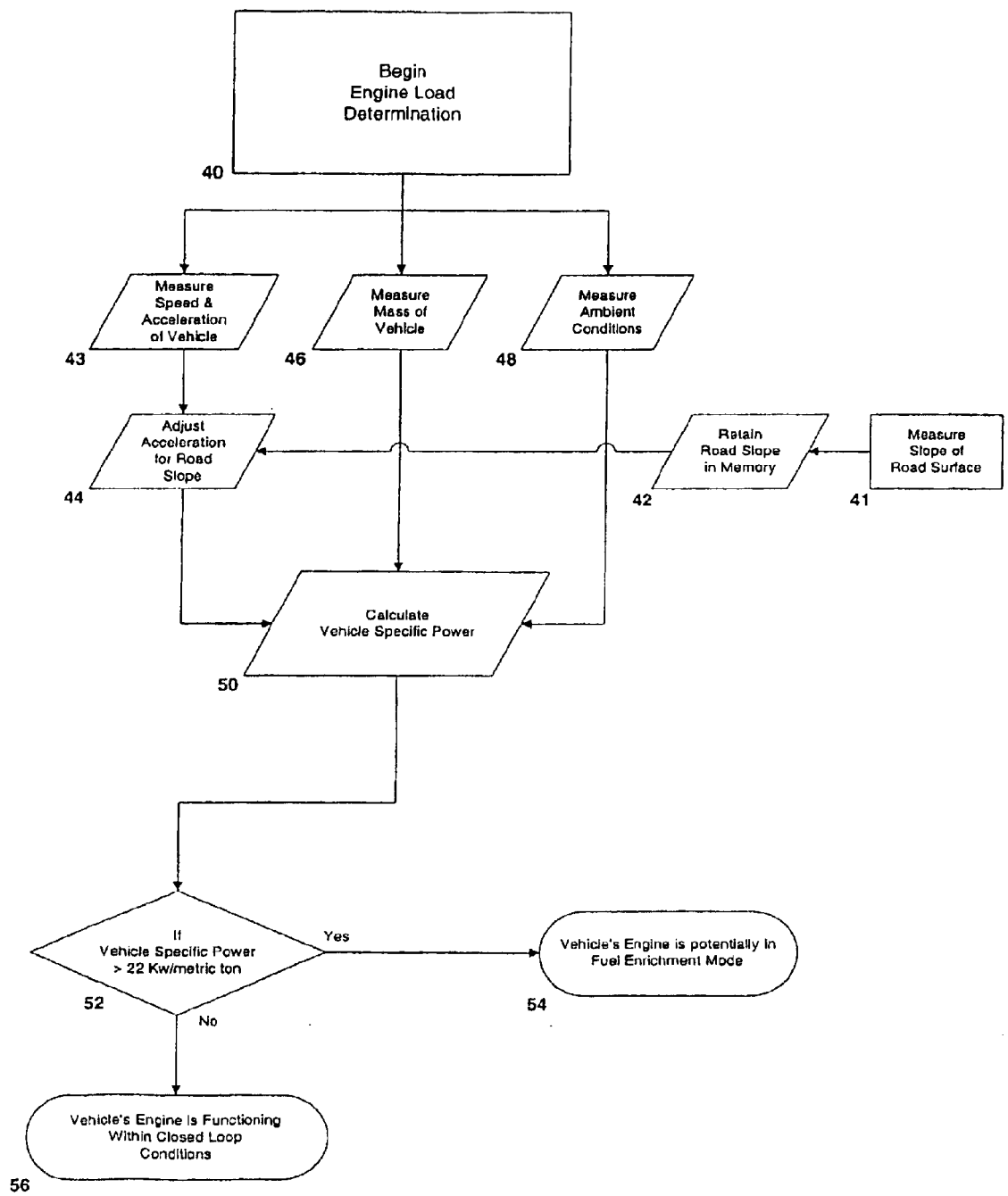
FIG. 2 is a block diagram that illustrates a determination of vehicle engine load.

FIG. 2 illustrates the exemplary steps that the present inventive system may follow to determine the load of a vehicle's engine. We have discovered that higher speeds and resulting increased loads on the engine produce greater emissions of benzene. We have also found that lower speeds correlate to higher emissions of the alkenes series of hydrocarbons. For these reasons, an open path vehicular emissions sensing system must include some method of accurately measuring the speed and acceleration of the vehicles being tested.

It may be desirable to have many speed and acceleration measurements in order to positively determine if a catalytic converter is potentially in a saturation mode, where the catalyst bed cannot oxidize enough carbon monoxide and hydrocarbons or reduce enough oxides of nitrogen to keep the vehicle functioning within emissions limits. This latter item is more site dependent for open path emissions sensors that are used on the side of the road. For example, a site that is prone to heavy acceleration should have more than one instance of speed and acceleration measurement, as this type of site will need the added information about possible catalyst saturation a significant portion of time (distance) ahead of the sample path.

Referring to FIG. 2 in the embodiments using an open path emissions sensor, the system preferably begins an engine load determination (step 40) by measuring or receiving data corresponding to up to four factors:

(1) vehicle speed and acceleration;
(2) road surface slope;
(3) vehicle mass; and
(4) one or more ambient conditions.

The first of these features, vehicle speed and acceleration, preferably are measured (Step 43) using an apparatus comprising two or more laser/photo-detector modules placed at known distances apart from each other along the vehicle path. The modules emit beams perpendicular to the roadway or path of travel of the vehicle, to a retro-reflective element located across the roadway. The beam is reflected back by the retro-reflective element and detected by the laser/photo-detector module. When a passing vehicle breaks the beam, the timing of the interruption of the beam is used to calculate an indication of speed and/or acceleration of the vehicle. Additional details and options relating to such a system are described in the co-pending U.S. patent application entitled Apparatus and Method for Measuring Vehicle Speed and/or Acceleration, filed May 2, 2001, having Ser. No. 09/846, 375, which is incorporated herein by reference in its entirety. Alternate methods of measuring speed and acceleration also may be used, although the above-described method is the preferred method.

The engine load determination also includes detecting the slope of the road surface (step 41). This is preferably performed using a tilt sensor that can detect the degree of tilt of the vehicle from a horizontal plane, such as would be created by the laser/photo-detector modules of the speed and acceleration measurement apparatus. Signals from the tilt sensor may then be used to adjust the measured acceleration for the acceleration of gravity pulling with or against the vehicle, best resulting in adjustment for road slope (step 44). Since road slope is not a volatile parameter, it can be measured at the beginning of a sampling session, and retained in memory (Step 42) for subsequent reference each time a vehicle passes through the emissions testing system.

The next two factors, vehicle mass and ambient concentrations, are optional but preferable. When considered, the vehicle's mass is measured (step 46), and one or more ambient conditions such as temperature, relative humidity, barometric pressure, and/or wind may be detected (step 48).

These factors, when measured, may be used to calculate the vehicle's specific power (step 50). Vehicle Specific Power (VSP) is generally the instantaneous power of a vehicle per unit of mass of the vehicle and is usually reported in Kilowatts per metric ton (Kw/tonne). Any available vehicle specific power calculation method and other known methods and such methods as may be hereafter developed, may be used. If the vehicle's specific power is determined to be above a predetermined limit (step 52) the system presumes that the vehicle's engine is in a fuel enrichment mode (step 54) due to a heavy load on the vehicle's engine. If the vehicle's specific power is not above the predetermined limit, the system presumes that the engine is operating under normal, closed loop conditions (step 56).

Studies have suggested that the largest number of vehicles are measured to have a VSP around 10 Kw/tonne. The United States Federal Test Procedure (FTP), used for determining the compliance with new car emissions standards for vehicles sold in the United States, has a maximum VSP of 22 Kw/tonne. Since the FTP has this as its maximum, the USEPA specified IM240 treadmill closed path emissions test also has 22 Kw/tonne as a maximum. For these reasons we suggest the 22 Kw/tonne as a limit for evaluation purposes, however a maximum VSP should be flexible to the experience measured from a fleet of vehicles in a given study area. Thus, other limits are possible and are included within the scope of the present invention.

As an alternative to calculating VSP, an alternate embodiment may assess the likelihood of fuel enrichment activity using the FTP, which has a maximum acceleration of approximately 3.3 miles per hour per second (MPH/s). The California Bureau of Automotive Repair procedures of applying a maximum acceleration/deceleration for a given speed used to determine open and/or closed loop emissions may also be used.

Figure 3:
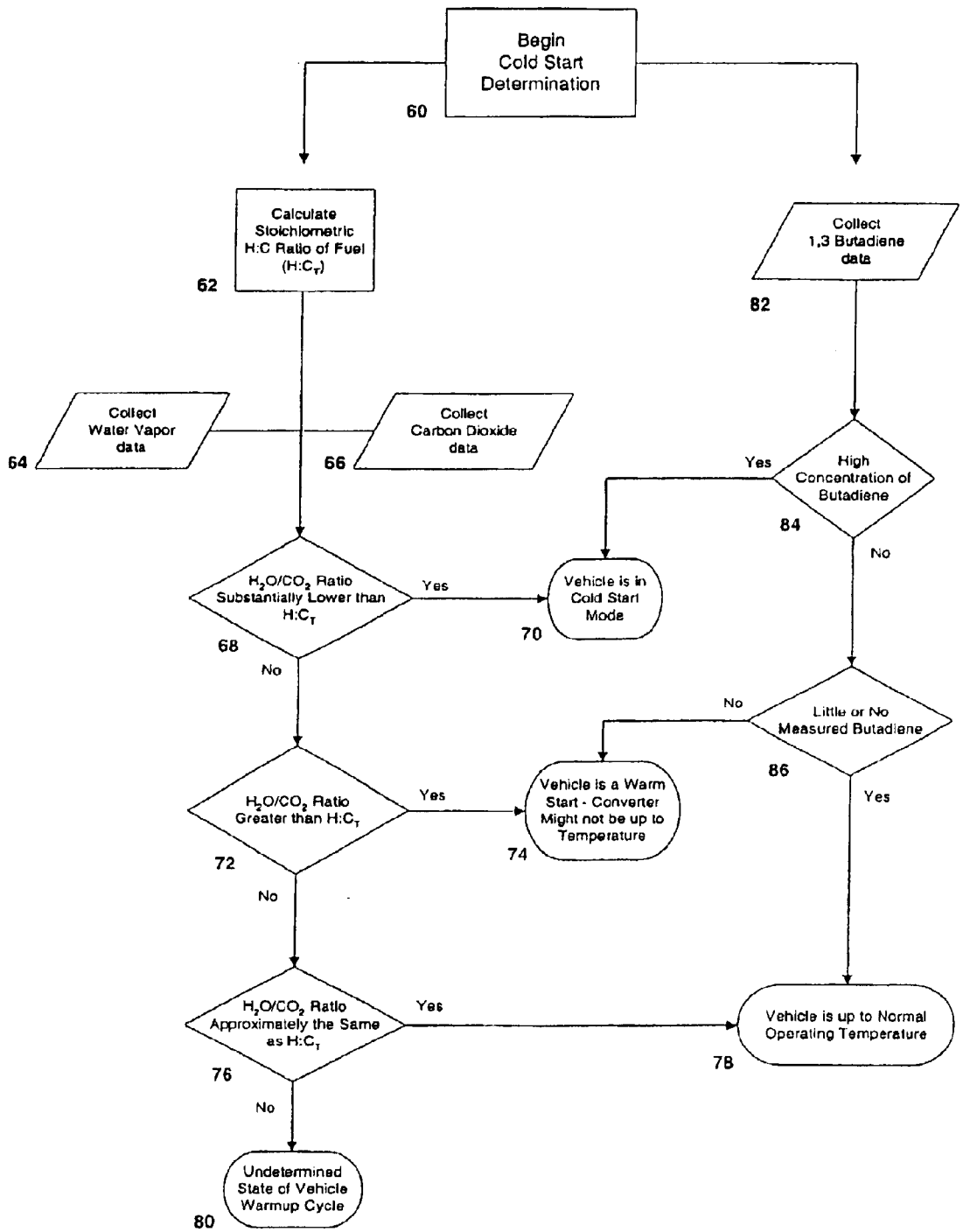
FIG. 3 is a block diagram that illustrates a determination of whether a vehicle is operating at normal operating temperature or in cold start mode.

FIG. 3 illustrates the exemplary steps by which the present inventive method and system may determine whether a vehicle is operating in a cold start mode or at normal operating temperature. Under normal stoichiometric operation, the ratio of water to carbon dioxide ($H_2O/CO_2$) in a vehicle's exhaust is typically constant and is directly related to the H:C ratio in the fuel. Furthermore, there are at least three potential states of engine warm-up that generally can be observed. These states and their expected effects on the expected $H_2O/CO_2$ ratio are:

Initial start up: water condenses in the exhaust system, leading to a substantially lower than the expected $H_2O/CO_2$ ratio.

Partial warm up: there is no longer condensation as exhaust components warm up, and with the addition of heat, water begins to vaporize. This condition enriches the water content of the exhaust and causes the $H_2O/CO_2$ ratio to be higher than the expected ratio.

Normal operating temperature: the exhaust system no longer retains nor emits water, thereby the exhaust system no longer interferes with the expected $H_2O/CO_2$ ratio.

Accordingly, to measure the $H_2O/CO_2$ ratio, in a preferred embodiment the open path sensor, or an alternate sensor used with the open path sensor, must be able to sample for water vapor in exhaust along with carbon dioxide. The measurement capabilities preferably have roughly the same resolution in order for the measurement of the ratio to be meaningful.

In addition, a gasoline powered vehicle without a catalytic converter or a vehicle not up to operating temperature will have higher levels of 1,3-butadiene in the exhaust stream than a vehicle with a properly functioning catalytic converter. 1,3-butadiene can feasibly be measured in the ultraviolet range of special absorption.

The method illustrated in FIG. 3 begins a cold start determination (step 60) by analyzing, using an open path emission sensor, speciated hydrocarbon emissions detected in the exhaust stream of the vehicle. Such a sensor may include a remote sensor that detects hydrocarbon emissions using methods such as ultraviolet and/or infrared light transmission, reflection and detection; sound wave transmission reflection and detection; or any other method. Based on the emissions data, the fuel type of the vehicle is determined using a method such as that described in the co-pending patent application entitled Method and System for Determining the Type of Fuel Used to Power a Vehicle, filed by the named inventors of the present invention, the disclosure of which is also incorporated herein by reference in its entirety.

Each fuel type corresponds to an expected hydrogen to carbon molar ratio ($H:C_T$) that is entered into this embodiment's retained memory (step 62), indicating the stoichiometric H:C ratio that would be expected when the vehicle is in normal operating mode rather than cold start mode. Typical gasoline stocks that can be found in the United States will yield a water to carbon dioxide ratio somewhere between 0.870 and 0.925 for an $H:C_T$ ratio of 1.78:1 to 1.85:1. This ratio of hydrogens to carbons in the fuel is available from the American Petroleum Institute and other sources. The ratio may be different in different geographic areas throughout the world depending upon fuel requirements that are part of air quality mitigation efforts.

The method also collects water vapor data (step 64) and carbon dioxide data (step 66) from the vehicle exhaust, preferably using an open path emissions sensor but optionally using a closed path sensor. An embodiment of a closed path sensor will preferably sample for water vapor prior to any chiller or other device that is designed to remove water vapor from a sample prior to introduction into the sample cell. The system then determines whether the $H_2O/CO_2$ ratio, using the data collected in steps 64 and 66, is substantially lower than the expected $H:C_T$ (step 68.) If the $H_2O/CO_2$ ratio is substantially lower than the expected $H:C_T$, the method concludes that the vehicle is in a cold start mode (step 70). If the $H_2O/CO_2$ ratio is greater than $H:C_T$ (step 72) the system concludes that the vehicle is in warm start mode but the catalytic converter might not be up to its full operating temperature (step 74). If the $H_2O/CO_2$ ratio is approximately the same as the expected $H:C_t$ (step 76), the method concludes that the vehicle is operating at its normal operating temperature (step 78). If none of the comparisons of steps 68, 72, and 76 are conclusive, the method may conclude that the vehicle's warm up cycle is in an undetermined state (step 80).

Additionally, or as an alternative to checking the H:C ratio, the cold start determination may also include collecting 1,3-butadiene data from the vehicle's exhaust (step 82). If the concentration of 1,3-butadiene exceeds a predetermined threshold (step 84) the method also concludes that the vehicle is in a cold start mode (step 70). If the method determines that there is little or no measured 1,3-butadiene in the vehicle's exhaust (step 86) the system concludes that the vehicle is operating at its normal operating temperature (step 78). If there is more than a trace amount of 1,3-butadiene in the exhaust, but the amount does not exceed the predetermined threshold of step 84, the system may conclude that the vehicle is in a warm start mode but still not up to its normal operating temperature (step 74). A potential pitfall exists with the 1,3-butadiene method of determining cold start, and that is in regions of the world that use methanol as the primary fuel. As the content of methanol or even ethanol increases as a percentage of the total fuel, the amount of 1,3-butadiene in exhaust diminishes. For this reason, the preferred method of cold start determination is to use the $H_2O/CO_2$ method primarily, with the 1,3-butadiene method being an adjunct to the $H_2O/CO_2$ method, though the 1,3-butadiene method works well for straight gasoline and slightly oxygenated gasoline.

Figure 4:
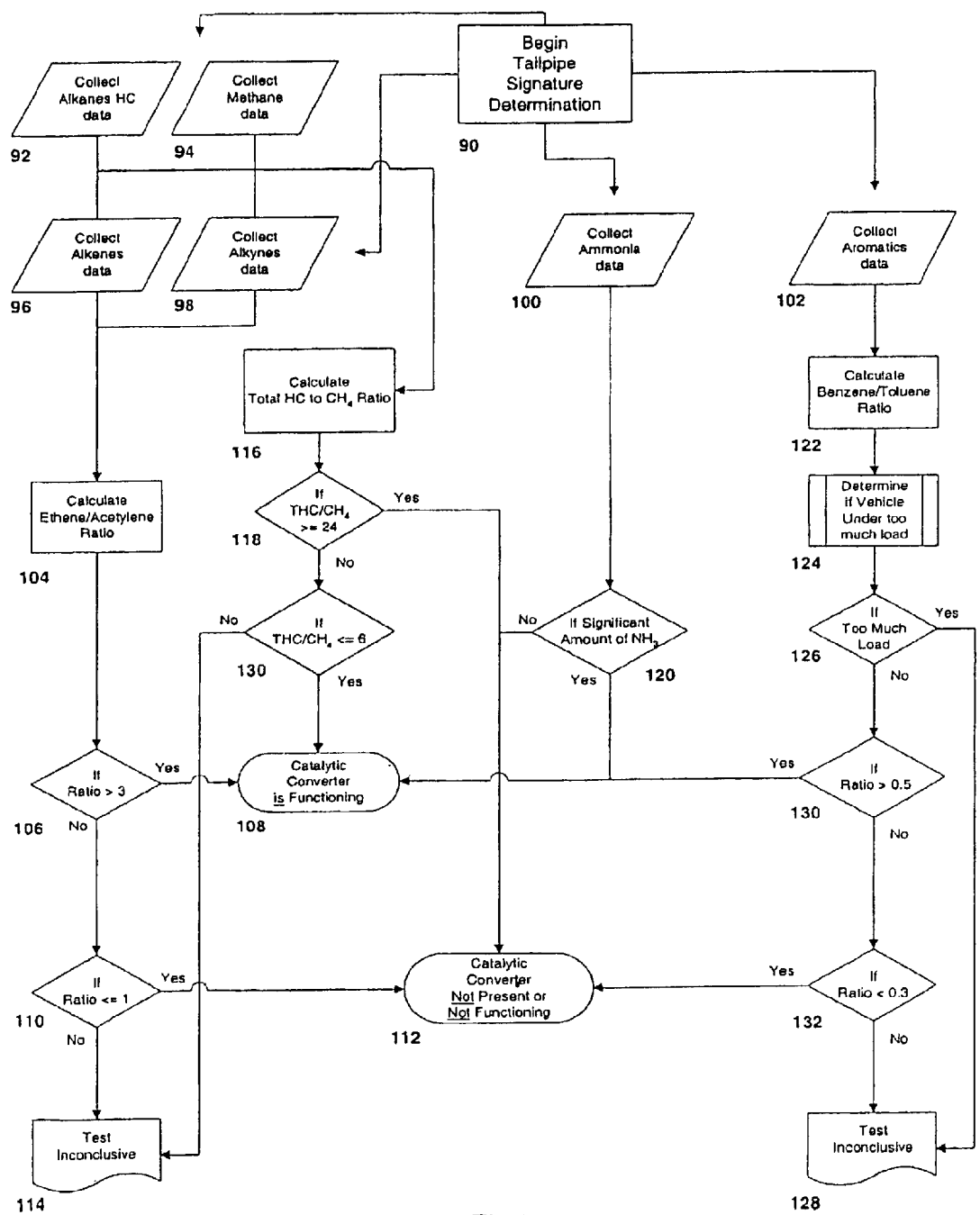
FIG. 4 is a block diagram that illustrates a determination of a vehicle's tailpipe signature.

FIG. 4 is a block diagram that illustrates determining a tailpipe signature based on a vehicle's exhaust. The tailpipe signature determination is collected using an emissions sensor, preferably an open path sensor but optionally a closed path sensor, that emits a beam of light, preferably in the infrared spectrum to a reflector, and the reflected light is received by the emissions sensor. The transmitted beam and/or the reflected beam will pass through vehicle tailpipe emissions, and the resulting spectrum may be analyzed to determine the presence of hydrocarbons and other species in the tailpipe. Expected frequencies on the infrared spectrum at which various components of the emissions would be expected to be seen are illustrated in the following chart:

| Species | Absorption Frequency |
|---|---|
| Carbon Monoxide (CO) | $4.65\mu$ |
| Carbon Dioxide ($CO_2$) | $4.30\mu$ |
| $HC_1$ (Alkanes) | $3.45\mu$ |
| $HC_2$ (Alkenes) | $3.17\mu$ |
| $HC_3$ (Alkynes) | $3.01\mu$ |
| $HC_4$ (Methane) | $3.31\mu$ |
| $H_2O$ (Water) | $2.75\mu$ |
| Reference | $3.85\mu$ |

The tailpipe signature determination includes collecting alkanes data (step 92), methane data (step 94), alkenes data (step 96), alkynes data (step 98), ammonia data (step 100), and aromatics data (step 102).

Based on the alkanes, methane, alkenes, and alkynes data, the system calculates the ethylene/acetylene ratio (step 104) from data collected in steps 96 and 98 respectively. A vehicle that lacks a catalytic converter or has a malfunctioning catalytic converter will typically have an ethylene/acetylene ratio of one. A vehicle with a catalytic converter that is functioning as designed will typically have an ethylene/acetylene ratio greater than three due mainly to the fact that a catalytic converter is more effective in oxidizing triple bond hydrocarbons such as acetylene than double and single bond hydrocarbons. Accordingly, the system checks whether the ethylene/acetylene ratio is greater than three (step 106) and determines that the catalytic converter is functioning (step 108) if the ratio is greater than three. If the ratio is not greater than three but the system determines that the ratio is less than or equal to one (step 110), the system concludes that the catalytic converter is either not present or not functioning in a proper manner (step 112).

The system also uses the alkanes, alkenes, and alkynes data to check the ratio of total hydrocarbons to methane (step 116). A higher percentage of methane relative to the other major hydrocarbon groups is an indicator of a healthy catalytic converter. This is especially true if there are no measurable amounts of alkynes and alkenes in the exhaust. Exhaust from a vehicle with a functioning catalytic converter will generally contain a higher overall percentage of methane and alkanes than exhaust from a vehicle with a worn out or not-up-to-proper operating temperature catalytic converter. Thus, if the system determines that the ratio of total hydrocarbons to methane is greater than or equal to a predetermined number, preferably about 24 (step 118), the system concludes that the catalytic converter is not present or not functioning in the proper manner (step 112). If not, and if the ratio of total hydrocarbons to methane is less than or equal to six (step 130), the system concludes that the catalytic converter is functioning in a proper manner (step 108). This step of hydrocarbon ratioing can be unreliable for vehicles fueled with compressed natural gas (CNG), therefore it is desirable to determine the type of fuel used to power the vehicle prior to executing this step. As stated above, there is a co-pending patent application entitled Method and System for Determining the Type of Fuel Used to Power a Vehicle, filed by the named inventors of the present invention. Notwithstanding, the tests outlined in FIG. 4 can be performed regardless of the type of fuel being used for a vehicle. An adjustment to the parameters of steps 118 and 130 can be made for fuels other than gasoline.

A gasoline powered vehicle that does not have a properly operating catalytic converter will generally have much lower levels of ammonia in the exhaust stream than a vehicle with a catalytic converter that functions as designed and at normal operating temperature. If a significant amount of ammonia is not detected (step 120) the system may conclude that the catalytic converter is not present or not functioning (step 112). However, if it is determined that there is a significant amount of ammonia detected in the exhaust stream (step 120), then the catalytic converter is functioning properly (step 108).

The ratio of benzene to toluene may also be calculated (step 122) to provide an indication of whether a catalytic converter is functioning. The greater magnitude of this ratio, the higher functionality of the catalytic converter that is expected. We have found that the benzene/toluene ratio of a vehicle not having a functioning catalytic converter is generally expected to be about 0.3, while the benzene to toluene ratio of a vehicle with a functioning catalytic converter will typically be about 0.5 or greater. However, the vehicle's load can effect the determination. Thus, the present invention preferably checks the load of the vehicle (step 124) as described in the text relating to FIG. 2, and if the vehicle is under a specified load amount (step 126) the benzene to toluene ratio test is determined to be inconclusive (step 128). If the load is not over the threshold, and if the ratio of benzene to toluene is greater than about 0.5 (step 130), the system may conclude that the catalytic converter is functioning (step 108). If the ratio is less than about 0.3 (step 132) the system may conclude the catalytic converter is either not present or not functioning (step 112).

It is possible that the above-described calculations may yield inconsistent results. In such a case, the inconsistency may be resolved by any number of methods, such as the highest number of consistent results, a scoring, or a ranking. A preferred ranking, in order of most preferred to least preferred, is ethylene/acetylene ratio, methane to total hydrocarbons ratio, presence and magnitude of ammonia, and benzene/toluene ratio. However, other rankings may be used.

Figure 5:
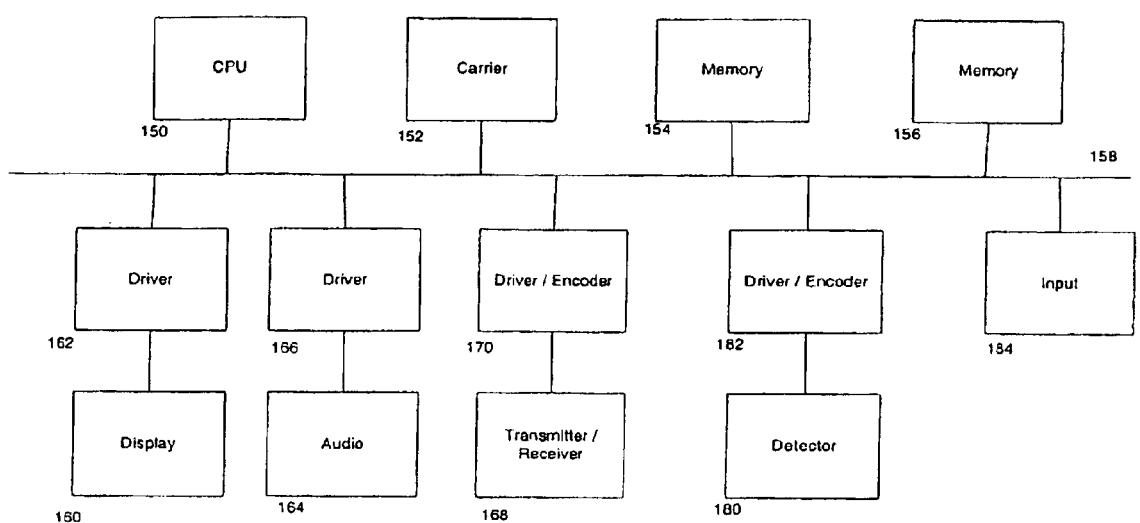
FIG. 5 illustrates exemplary hardware features that may be used to accomplish certain features of the present invention.

FIG. 5 illustrates exemplary hardware features that may be used to accomplish certain features of the present invention. Referring to FIG. 5, the present inventive system preferably includes a processing device 150 and a computer program memory or other carrier 152 that stores computer program instructions to instruct the processor to perform certain functions. Optionally, multiple memories may be used such as 154 and 156, which may be hard drives, floppy disks, CD-ROMs, CD-Rs, DVDs, RAM, external memory devices such as ZIP drives, or other types of memory devices may be included to house additional program instructions, databases, and/or other items. A central bus 158 transfers information between the memory or memories, processor, and other elements. Such other elements may include an optional display 160 and a display driver 162, an optional audio output 164 and audio driver 166, and an optional transmitter and/or receiver 168 and associated drivers or encoders 170. Optionally, one or more detectors 180 for collecting emissions data are provided. Such detectors may be connected directly to the bus 158, optionally through one or more encoders or drivers 182. Alternatively, the detector may be a remote detector that gathers data, and the data may be delivered to the CPU and/or the memory after being received by the receiver 168 or another input device 184.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, all of which may fall within the scope of the invention.

What is claimed is:

1. A method of detecting the function of a catalytic converter in a vehicle, comprising:

determining a first indication corresponding to whether a vehicle moving on a road is operating in a closed loop operating condition;

determining a second indication corresponding to whether the vehicle is operating at a temperature that is substantially at least equal to its formal operating temperature;

receiving data collected by an open path emissions sensor, wherein the data corresponds to a plurality of measured hydrocarbon and other tailpipe emissions concentrations in an exhaust stream of the vehicle; and determining a third indication corresponding to whether the data is indicative of a properly functioning catalytic converter;

wherein the step of determining a first indication comprises:

measuring a speed of the vehicle;

measuring an acceleration of the vehicle;

measuring a slope of the road;

measuring a mass of the vehicle;

measuring at least one ambient condition;

calculating, using the speed, the acceleration, the slope, the mass, and the at least one ambient condition, a specific power; and comparing the specific power to a predetermined limit.

2. The method of claim 1 wherein the step of determining a first indication further comprises adjusting the acceleration to correspond to the slope.

3. The method of claim 1 wherein the step of determining a second indication comprises:

measuring, using the emissions sensor, an amount of water vapor in the exhaust stream;

measuring, using the emissions sensor, an amount of carbon dioxide in the exhaust stream;

determining, using the amount of water and the amount of carbon dioxide, a ratio of water and carbon dioxide; and comparing the ratio to a predetermined fuel factor.

4. The method of claim 1 wherein the step of determining a third indication comprises:

measuring, using the emissions sensor, an amount of ammonia in the exhaust stream; and comparing the amount of ammonia to a predetermined threshold.

5. The method of claim 1 wherein the step of determining a third indication comprises:

measuring, using the emissions sensor, an amount of benzene in the exhaust stream;

measuring, using the emissions sensor an amount of toluene in the exhaust stream;

calculating a ratio of the amount of benzene and the amount of toluene; and comparing the ratio to a predetermined threshold.

6. A method of detecting the function of a catalytic converter in a vehicle, comprising:

determining a first indication corresponding to whether a vehicle moving on a road is operating in a closed loop operating condition;

determining a second indication corresponding to whether the vehicle is operating at a temperature that is substantially at least equal to its normal operating temperature;

receiving data collected by an open path emissions sensor, wherein the data corresponds to a plurality of measured hydrocarbon and other tailpipe emissions concentrations in an exhaust stream of the vehicle; and determining a third indication corresponding to whether the data is indicative of a properly functioning catalytic converter;

wherein the step of determining a second indication comprises:

measuring, using the emissions sensor, an amount of 1,3-butadiene in the exhaust stream; and determining whether the amount exceeds a predetermined threshold.

7. A method of detecting the function of a catalytic converter in a vehicle, comprising:

determining a first indication corresponding to whether a vehicle moving on a road is operating in a closed loop operating condition;

determining a second indication corresponding to whether the vehicle is operating at a temperature that is substantially at least equal to its normal operating temperature;

receiving data collected by an open path emissions sensor, wherein the data corresponds to a plurality of measured hydrocarbon and other tailpipe emissions concentrations in an exhaust stream of the vehicle; and determining a third indication corresponding to whether the data is indicative of a properly functioning catalytic converter;

wherein the step of determining a third indication comprises:

measuring, using the emissions sensor, an amount of ethylene in the exhaust stream;

measuring, using the emissions sensor, an amount of acetylene in the exhaust stream;

calculating a ratio of the amount of ethylene and the amount of acetylene; and comparing the ratio to a predetermined threshold.

8. A method of detecting the function of a catalytic converter in a vehicle, comprising:

determining a first indication corresponding to whether a vehicle moving on a road is operating in a closed loop operating condition;

determining a second indication corresponding to whether the vehicle is operating at a temperature that is substantially at least equal to its normal operating temperature;

receiving data collected by an open path emissions sensor, wherein the data corresponds to a plurality of measured hydrocarbon and other tailpipe emissions concentrations in an exhaust stream of the vehicle; and determining a third indication corresponding to whether the data is indicative of a properly functioning catalytic converter;

wherein the step of determining a third indication comprises:

measuring, using the emissions sensor, an amount of total hydrocarbons in the exhaust stream;

measuring, using the emissions sensor, an amount of methane in the exhaust stream;

calculating a ratio of the amount of total hydrocarbons and the total methane; and comparing the ratio to a predetermined threshold.

9. A method of detecting the function of a catalytic converter in a vehicle, comprising:

determining a first indication corresponding to whether a vehicle moving on a road is operating in a closed loop operating condition;

determining a second indication corresponding to whether the vehicle is operating at a temperature that is substantially at least equal to its normal operating temperature;

receiving data collected by an open path emissions sensor, wherein the data corresponds to a plurality of measured hydrocarbon and other tailpipe emissions concentrations in an exhaust stream of the vehicle; and determining a third indication corresponding to whether the data is indicative of a properly functioning catalytic converter;

wherein the step of determining a third indication comprises:

measuring, using the emissions sensor, an amount of benzene in the exhaust stream;

measuring, using the emissions sensor an amount of toluene in the exhaust stream;

calculating a ratio of the amount of benzene and the amount of toluene; and comparing the ratio to a predetermined threshold; and wherein the steps of calculating and comparing are not required if the first indication is indicative of an open loop operating condition.

10. A system for determining whether a moving vehicle has a properly functioning catalytic converter, comprising:

an open path emissions sensor capable of measuring a plurality of measured hydrocarbons and other emissions from an exhaust stream of a moving vehicle;

a processor in communication with the emissions sensor; and a memory in communication with the processor;

wherein the memory contains computer program instructions that instruct the processor to perform the steps of:

determining a first indication corresponding to whether the vehicle is operating in a closed loop operating condition;

determining whether the vehicle is operating at a temperature that is substantially at least equal to its normal operating temperature;

receiving data collected by the emissions sensor, wherein the data corresponds to a plurality of measured hydrocarbon and other tailpipe emissions concentrations in an exhaust stream of the vehicle; and determining whether the data is indicative of a properly functioning catalytic converter;

wherein the memory contains computer program instructions that further instruct the processor to perform the steps of:

measuring a speed of the vehicle;

measuring an acceleration of the vehicle;

measuring a slope of a road;

measuring a mass of the vehicle;

measuring at least one ambient condition;

calculating, using the speed, the acceleration, the slope, the mass, and the at least one ambient condition, a specific power; and comparing the specific power to a predetermined limit.

11. A catalytic converter function detection system, comprising:

a means of determining a first indication corresponding to whether a vehicle moving on a road is operating in a closed loop operation condition;

a means for determining a second indication corresponding to whether the vehicle is operating at a temperature that is substantially at least equal to its normal operating temperature;

a means for receiving data collected by an open path emissions sensor, wherein the data corresponds to a plurality of measured hydrocarbon and other tailpipe emissions concentrations in an exhaust stream of the vehicle; and a means for determining a third indication corresponding to whether the data is indicative of a properly functioning catalytic converter;

wherein the means for determining a first indication comprises:

a means for measuring a speed of the vehicle;

a means for measuring an acceleration of the vehicle;

a means for measuring a slope of the road;

a means for measuring a mass of the vehicle;

a means for measuring at least one ambient condition;

a means for calculating, using the speed, the acceleration, the slope, the mass, and the at least one ambient condition, a specific power; and a means for comparing the specific power to a predetermined limit.

12. The system of claim 11 wherein the means for determining a second indication comprises:

a means for measuring an amount of water vapor in the exhaust stream;

a means for measuring an amount of carbon dioxide in the exhaust stream;

a means for determining, using the amount of water and the amount of carbon dioxide, a ratio of water and carbon dioxide; and a means for comparing the ratio to a predetermined fuel factor.

13. The system of claim 11 wherein the means for determining a third indication comprises:

a means for measuring an amount of ammonia in the exhaust stream; and a means for comparing the amount of ammonia to a predetermined threshold.

14. The system of claim 11 wherein the means for determining a third indication comprises:

a means for measuring an amount of benzene in the exhaust stream;

a means for measuring an amount of toluene in the exhaust stream;

a means for calculating a ratio of the amount of benzene and the amount of toluene and a means for comparing the ratio to a predetermined threshold.

15. A catalytic converter function detection system, comprising:

a means of determining a first indication corresponding to whether a vehicle moving on a road is operating in a closed loop operation condition;

a means for determining a second indication corresponding to whether the vehicle is operating at a temperature that is substantially at least equal to its normal operating temperature;

a means for receiving data collected by an open path emissions sensor, wherein the data corresponds to a plurality of measured hydrocarbon and other tailpipe emissions concentrations in an exhaust stream of the vehicle; and a means for determining a third indication corresponding to whether the data is indicative of a properly functioning catalytic converter;

wherein the means for determining a second indication comprises:

a means for measuring an amount of 1,3-butadiene in the exhaust stream; and a means for determining whether the amount exceeds a predetermined threshold.

16. A catalytic converter function detection system, comprising:

a means of determining a first indication corresponding to whether a vehicle moving on a road is operating in a closed loop operation condition;

a means for determining a second indication corresponding to whether the vehicle is operating at a temperature that is substantially at least equal to its normal operating temperature;

a means for receiving data collected by an open path emissions sensor, wherein the data corresponds to a plurality of measured hydrocarbon and other tailpipe emissions concentrations in an exhaust stream of the vehicle; and a means for determining a third indication corresponding to whether the data is indicative of a properly functioning catalytic converter;

wherein the means for determining a third indication comprises:

a means for measuring an amount of ethylene in the exhaust stream;

a means for measuring and amount of acetylene in the exhaust stream;

a means for calculating a ratio of the amount of ethylene and the amount of acetylene; and a means for comparing the ratio to a predetermined threshold.

17. A catalytic converter function detection system, comprising:

a means of determining a first indication corresponding to whether a vehicle moving on a road is operating in a closed loop operation condition;

a means for determining a second indication corresponding to whether the vehicle is operating at a temperature that is substantially at least equal to its normal operating temperature;

a means for receiving data collected by an open path emissions sensor, wherein the data corresponds to a plurality of measured hydrocarbon and other tailpipe emissions concentrations in an exhaust stream of the vehicle; and a means for determining a third indication corresponding to whether the data is indicative of a properly functioning catalytic converter;

wherein the means for determining a third indication comprises:

a means for measuring an amount of total hydrocarbons in the exhaust stream;

a means for measuring an amount of methane in the exhaust stream;

a means for calculating a ratio of the amount of total hydrocarbons and the total methane; and a means for comparing the ratio to a predetermined threshold.

* * * * *

UNITED STATES PATENT AND TRADEMARK OFFICE
CERTIFICATE OF CORRECTION

PATENT NO. : 6,857,262 B2
DATED : February 22, 2005
INVENTOR(S) : Rendahl et al.

It is certified that error appears in the above-identified patent and that said Letters Patent is hereby corrected as shown below:

Column 10,
Line 39, please replace "formal" with -- normal --.

Signed and Sealed this

Twenty-sixth Day of April, 2005

JON W. DUDAS
*Director of the United States Patent and Trademark Office*